Figure 3:
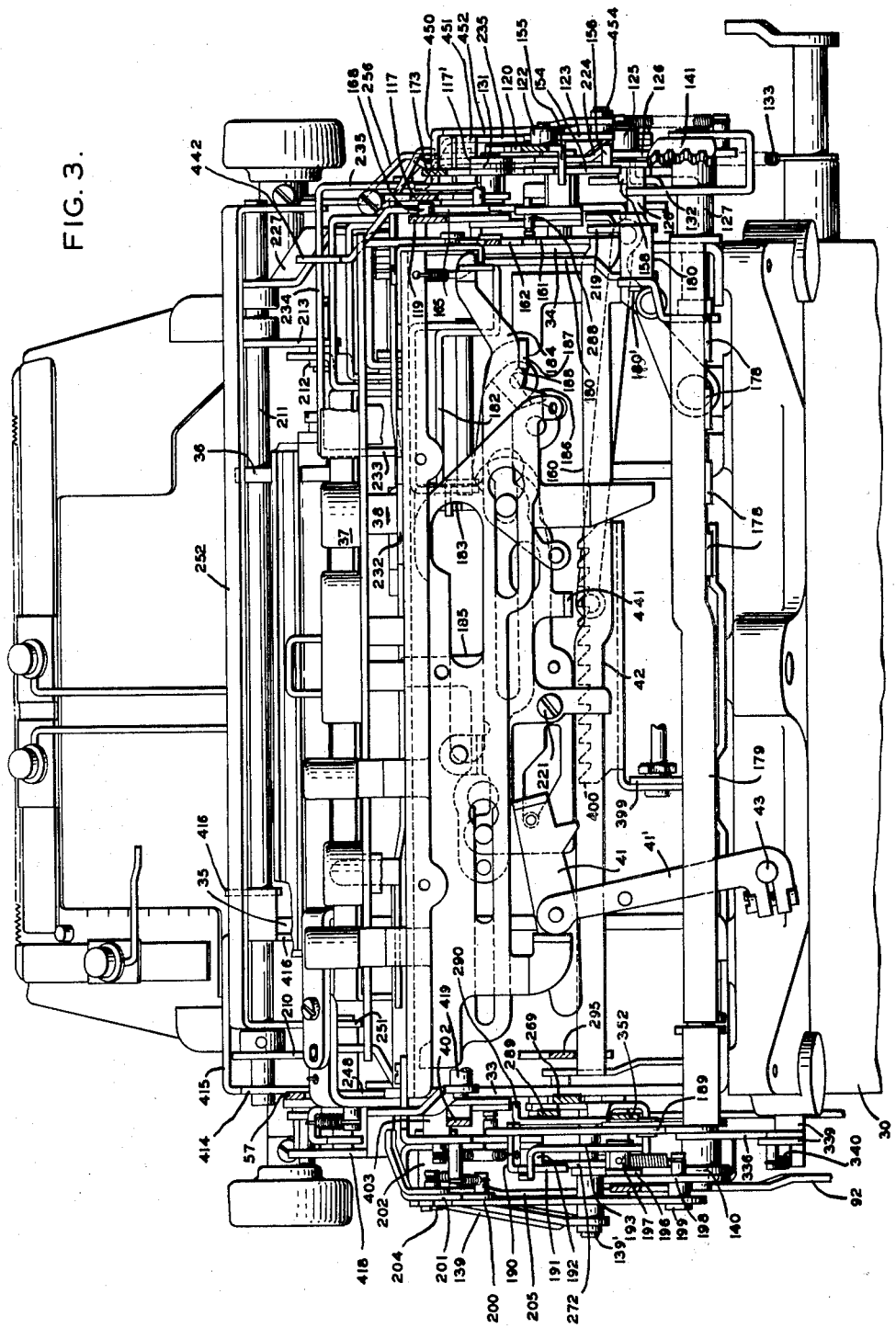

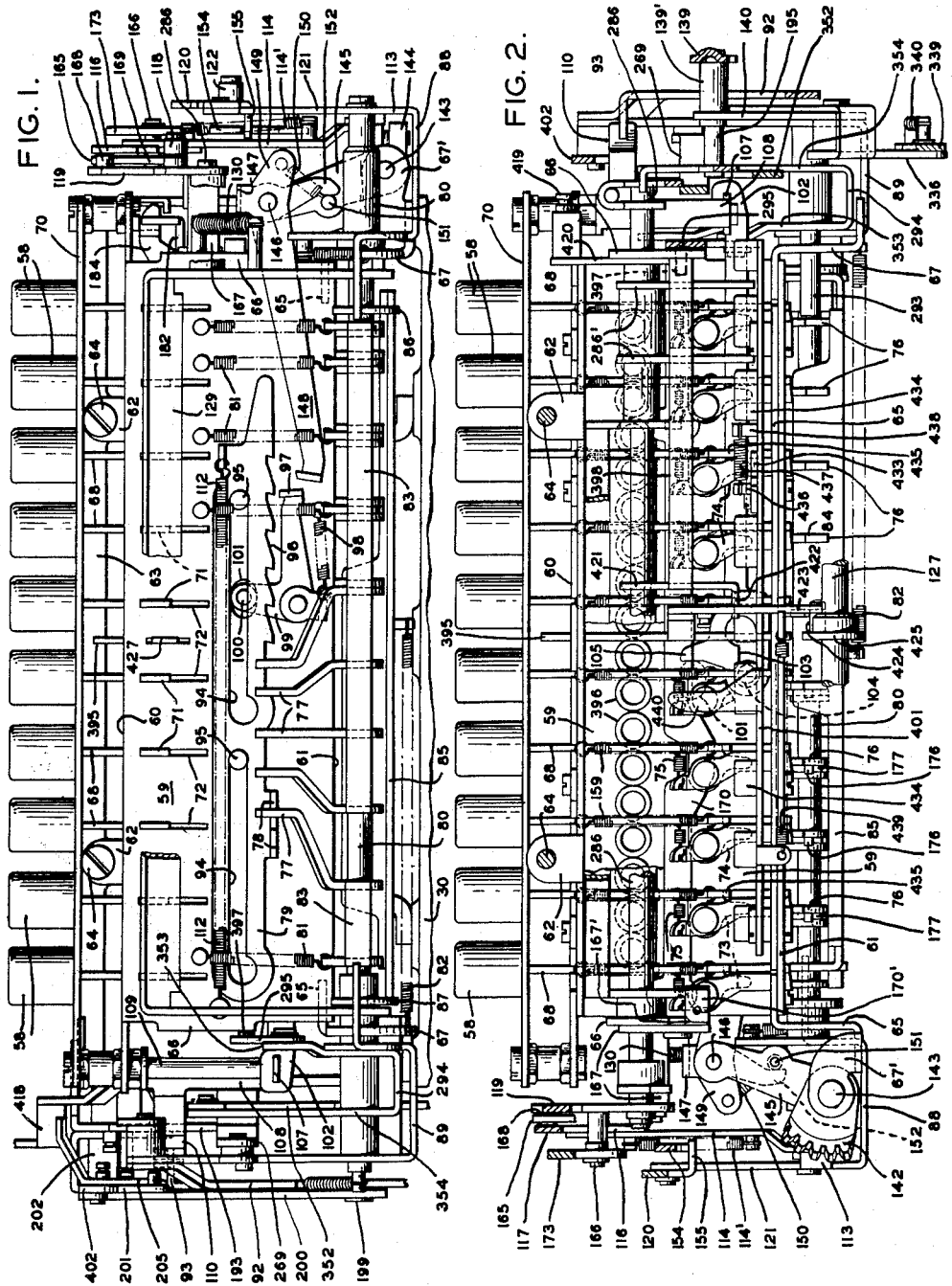

April 21, 1964 B. H. TINGLEY 3,129,882
KEY INTERLOCK MECHANISM FOR CALCULATING MACHINES
Original Filed May 12, 1954 21 Sheets-Sheet 4

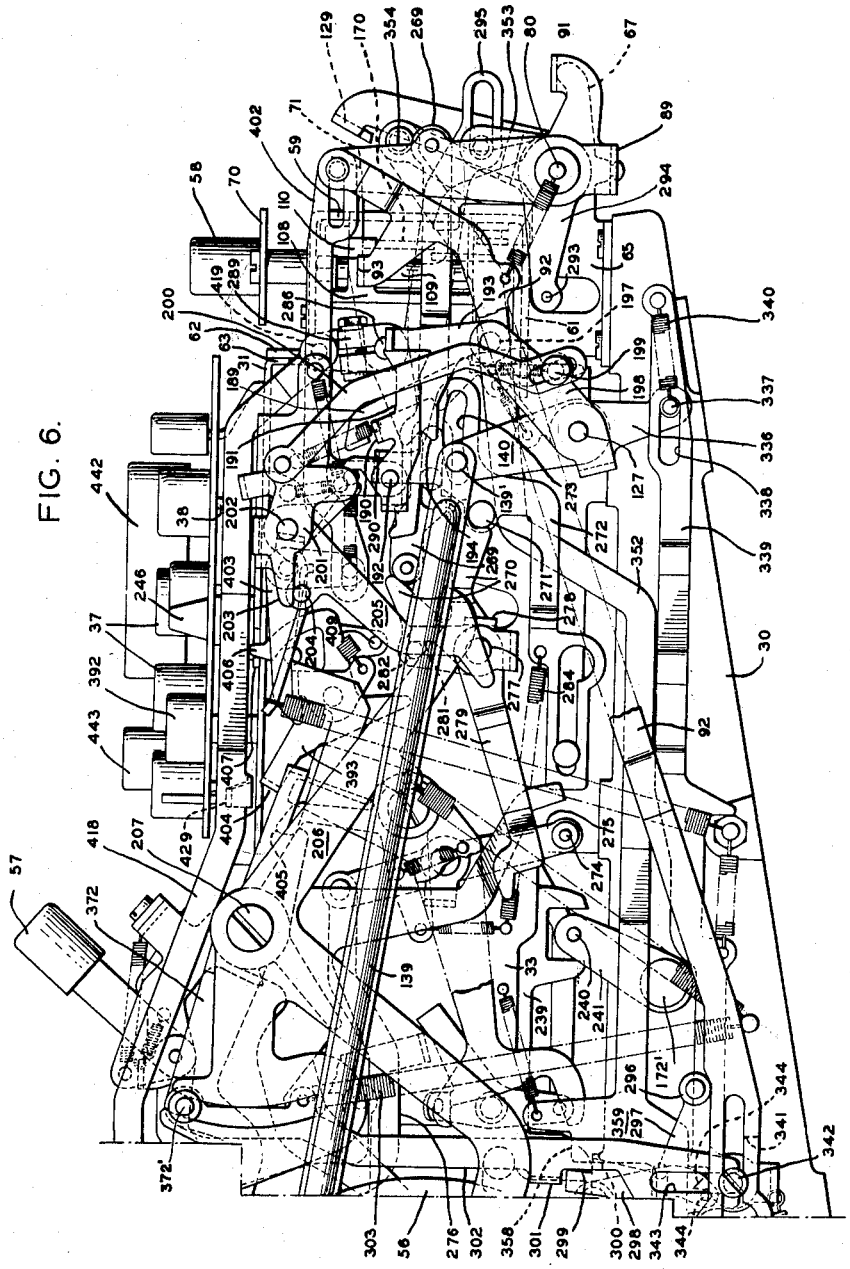

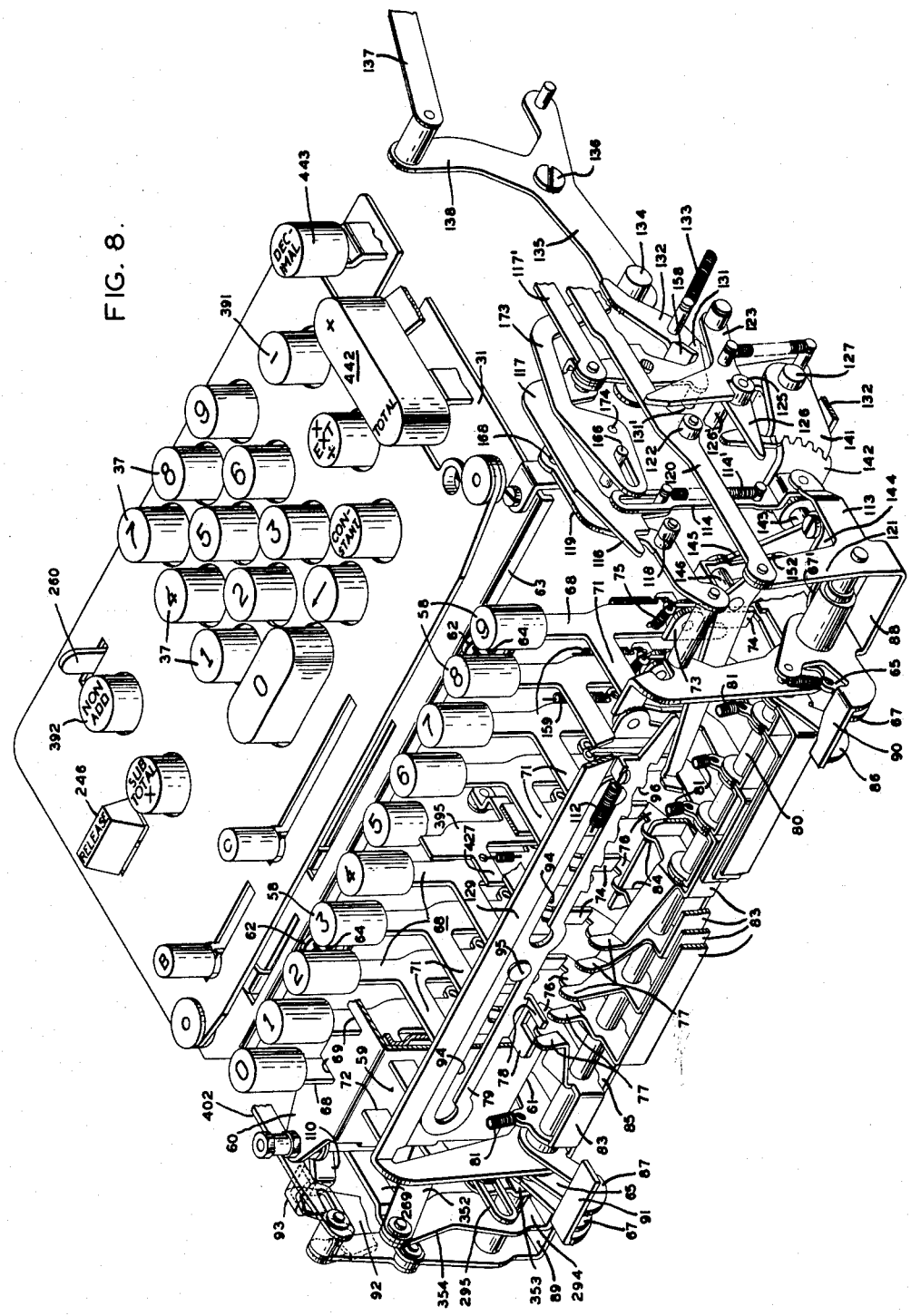

April 21, 1964  B. H. TINGLEY  3,129,882
KEY INTERLOCK MECHANISM FOR CALCULATING MACHINES
Original Filed May 12, 1954  21 Sheets-Sheet 11

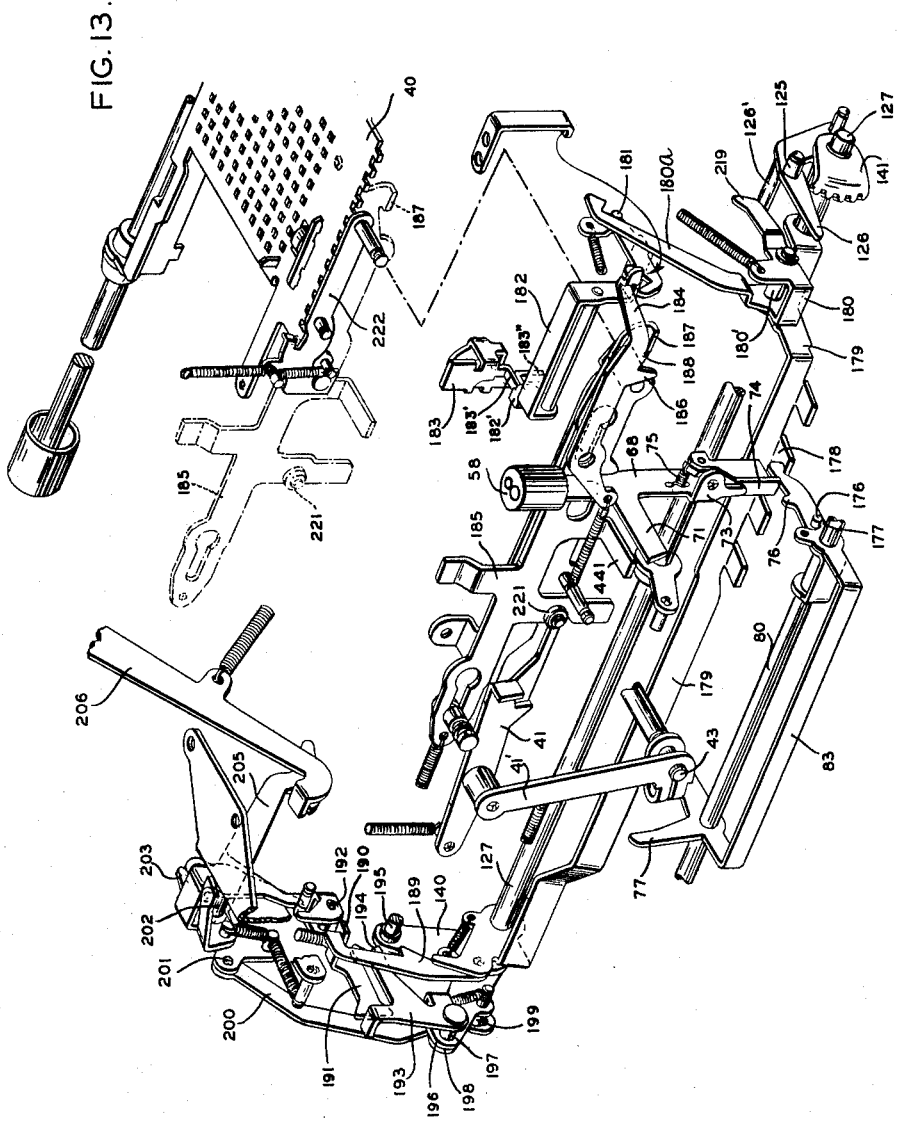

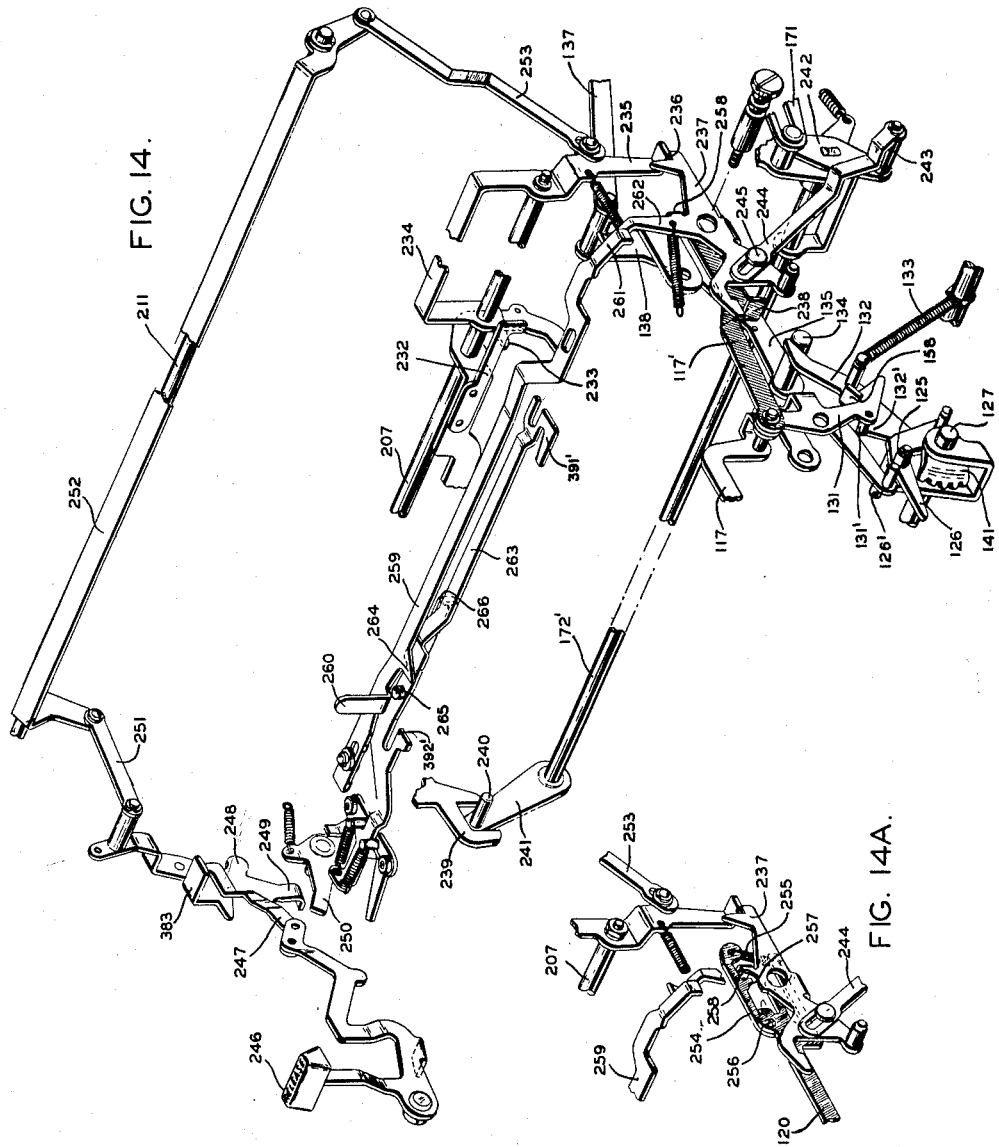

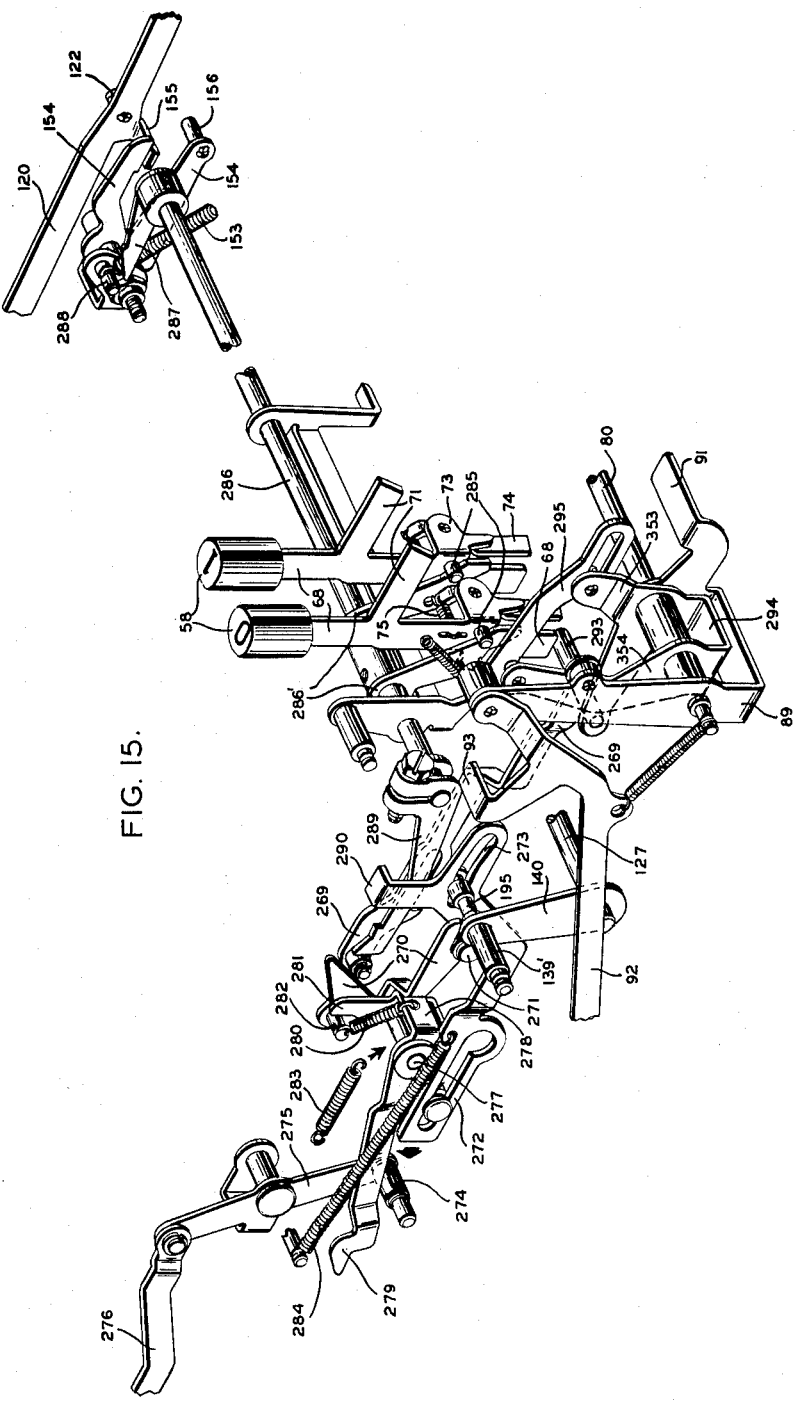

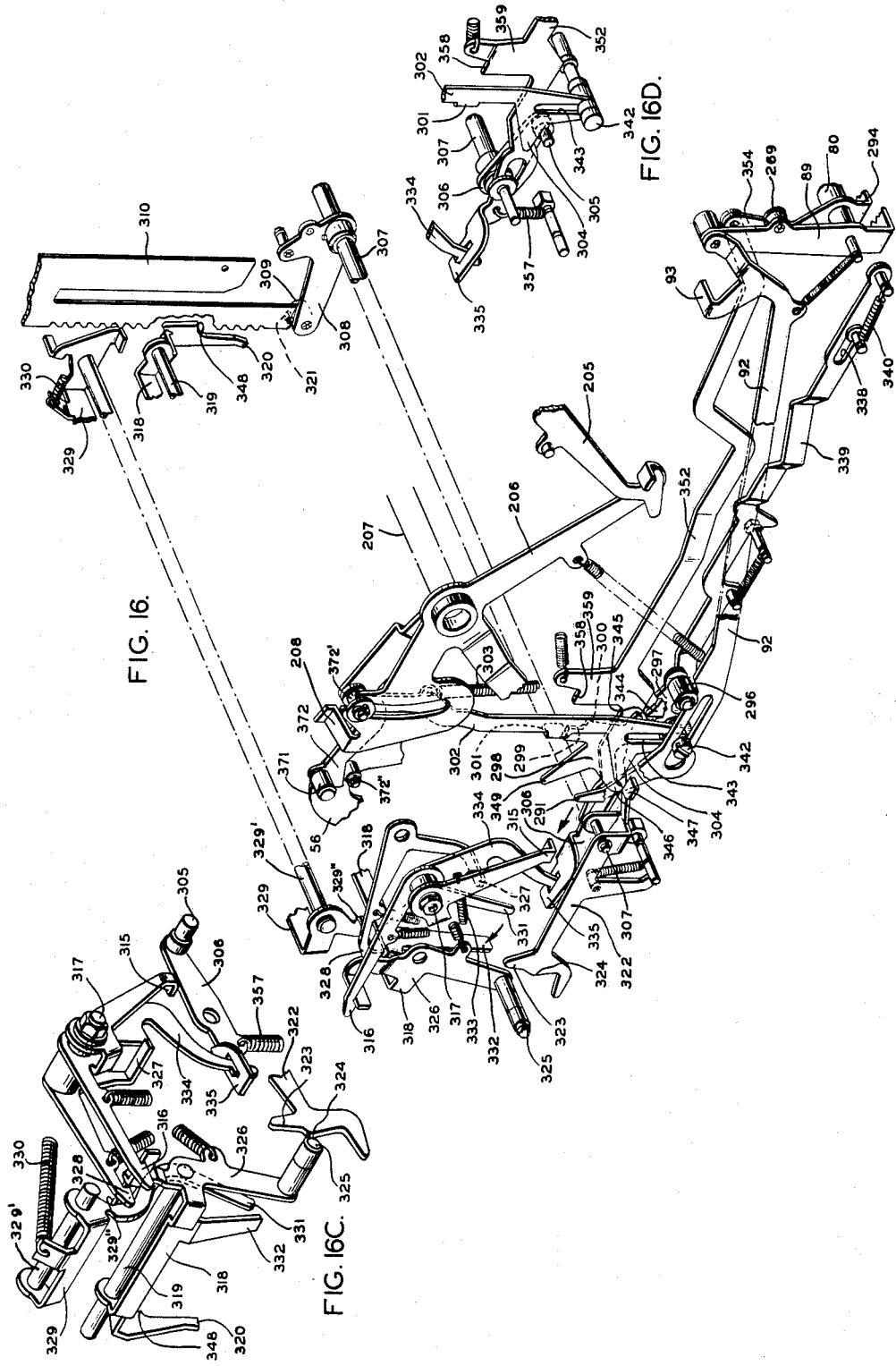

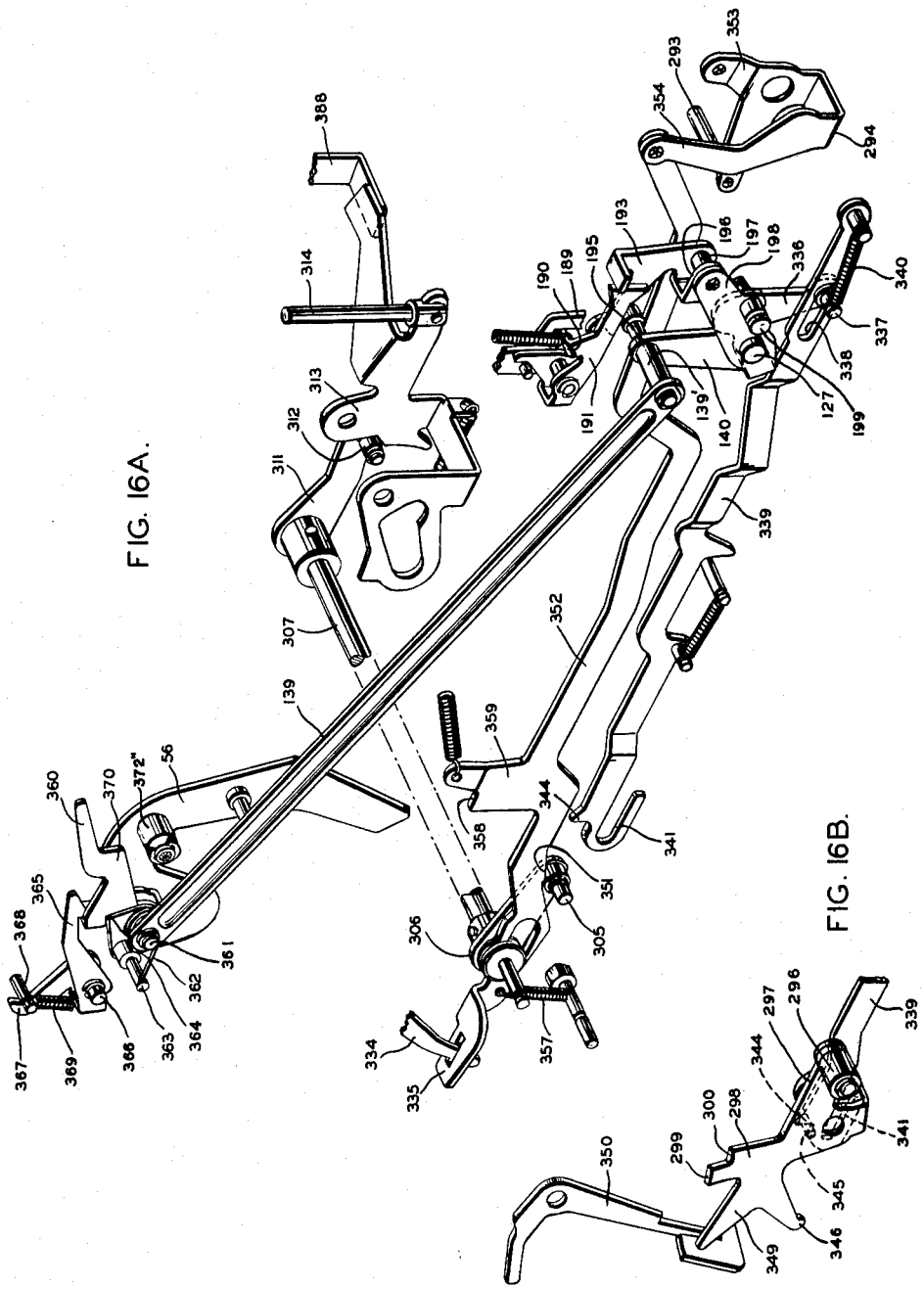

3,129,882
KEY INTERLOCK MECHANISM FOR CALCULATING MACHINES

Bruce Harrison Tingley, Pine City, N.Y., assignor, by mesne assignments, to Sperry Rand Corporation, New York, N.Y., a corporation of Delaware
Application Sept. 27, 1960, Ser. No. 58,814, which is a division of application Ser. No. 429,277, May 12, 1954, now Patent No. 2,984,411, dated May 16, 1961. Divided and this application Nov. 13, 1962, Ser. No. 241,462
4 Claims. (Cl. 235—130)

This invention relates to new and useful improvements in key interlock mechanism for calculating machines and has particular reference to improvements in the ten-key key-set type of calculator being a division of my co-pending application Serial Number 58,814, filed September 27, 1960, which application, in turn, is a division of my co-pending application Serial Number 429,277, filed May 12, 1954, now Patent No. 2,984,411, dated May 16, 1961.

The particular machine wherein this invention is embodied is an improvement over the machines disclosed in U.S. patents to Walter W. Landsiedel 2,203,336; 2,229,980; 2,237,881; 2,255,622; 2,688,439 and 2,726,037 in his name as follows:

It is more directly an improvement over Patent Nos. 2,688,439 and 2,726,037, more especially the latter which shows a calculator adapted to perform multiplication by a short cut method.

In the Patent 2,726,037 provision was made for short cut multiplication wherein the multiplicand was entered in the usual fashion and spaced in accordance with the number of digits in the multiplier. Then a short cut key was depressed, after which the multiply lever was pushed rearwardly and held for the proper number of cycles for each digit of the multiplier. As before, the machine would cycle through a blank and total stroke and print the product. The multiplicand and the first multiplier digit were printed at the end of cycling of the first digit. Subsequent multiplier digits were printed at the end of their respective series of cycles.

To facilitate the operation a dial was provided which indicates the successive cycles, so that the multiply lever could be released at the proper time.

The parent application S.N. 429,277, now Patent No. 2,984,411, is directed to the provision of mechanism to eliminate the dial and the lever altogether, and to provide a series of multiplier keys in addition to the regular keyboard so that after the multiplicand is entered and properly spaced it is merely necessary to press the desired multiplier key corresponding to the multiplier digit being entered into the machine, and the machine will take over and automatically cycle the proper number of times and then automatically take a total and print the product. There are no dials to watch or levers to hold and release. Just press down the proper key for the successive digits to be cycled.

The parent application S.N. 58,814 is directed to the provision of improved mechanism for the printing of multiplier and quotient digit symbols in response to selective actuation of multiplier keys.

The present invention is directed to the provision of improved key interlock mechanism.

Figure 4:
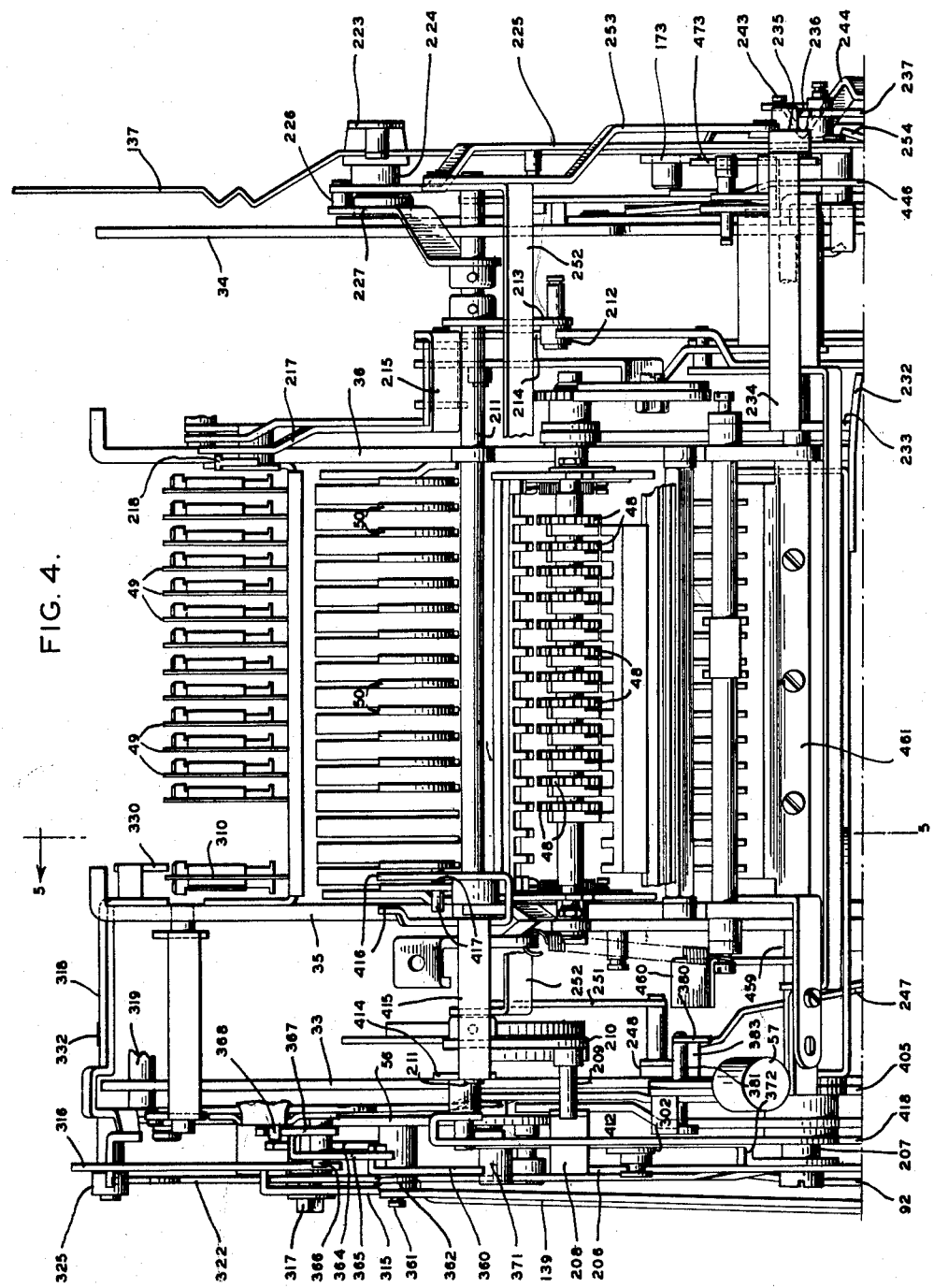
Figure 4A:
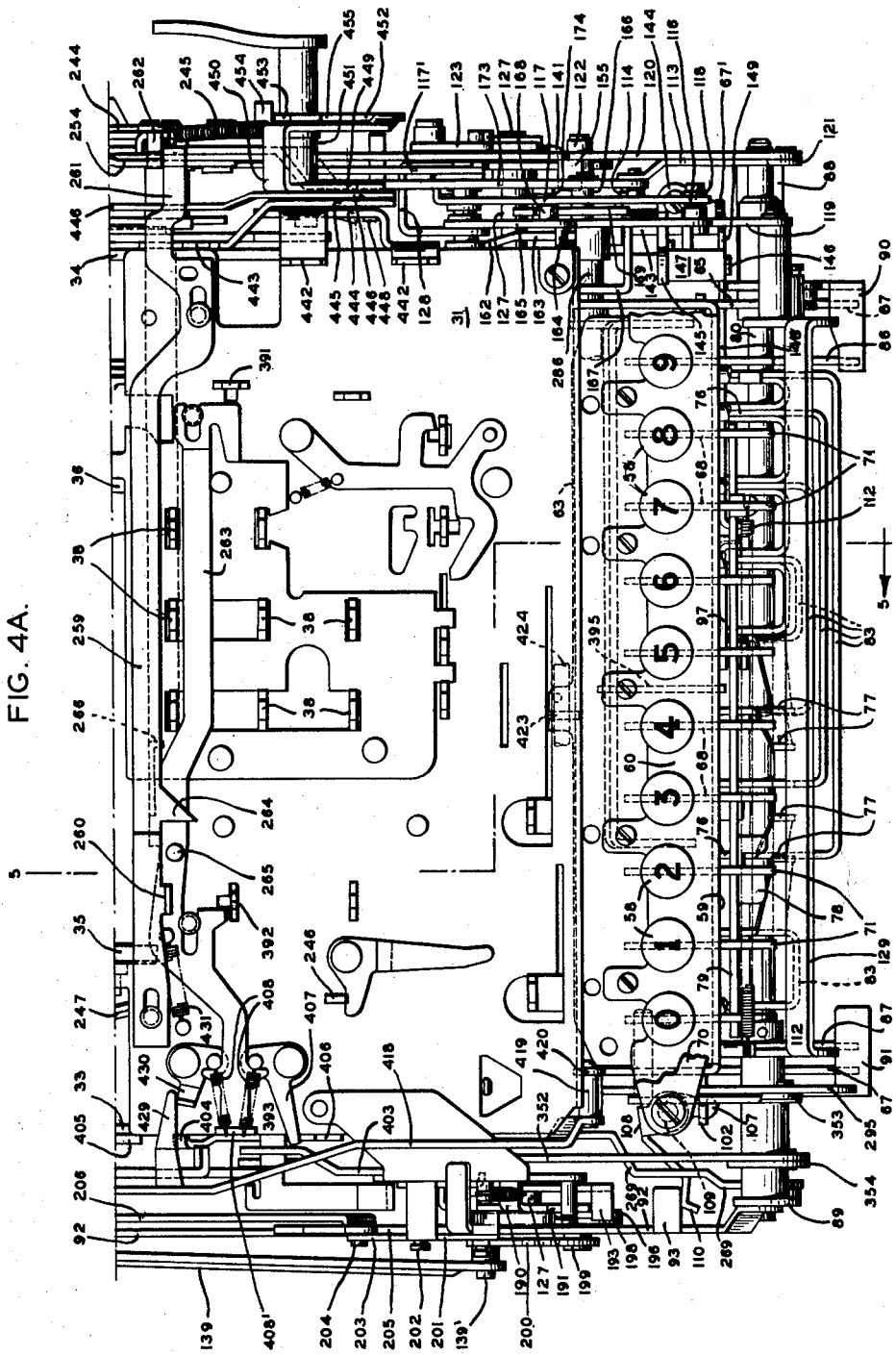
Figure 5:
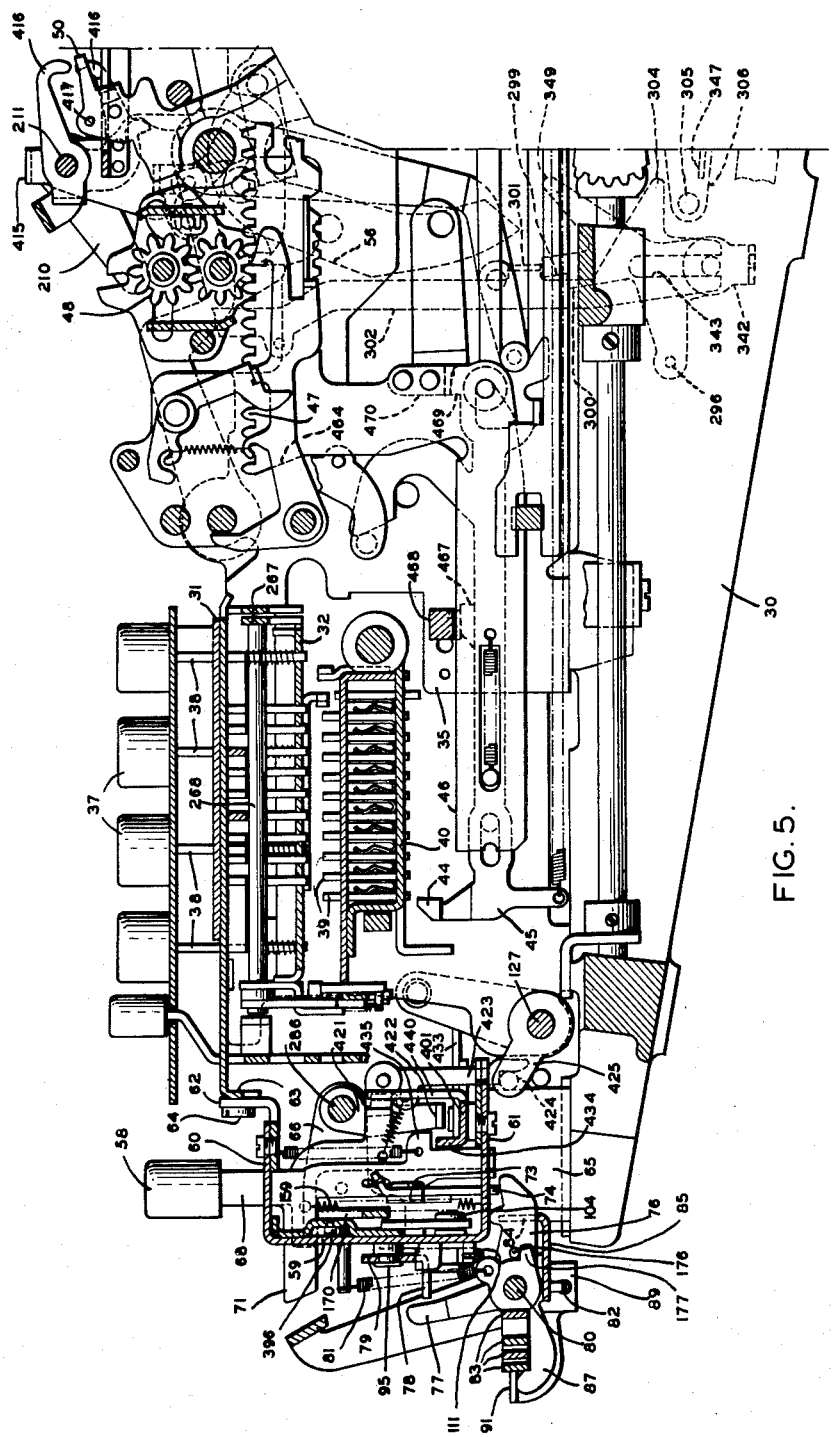
Figure 5A:
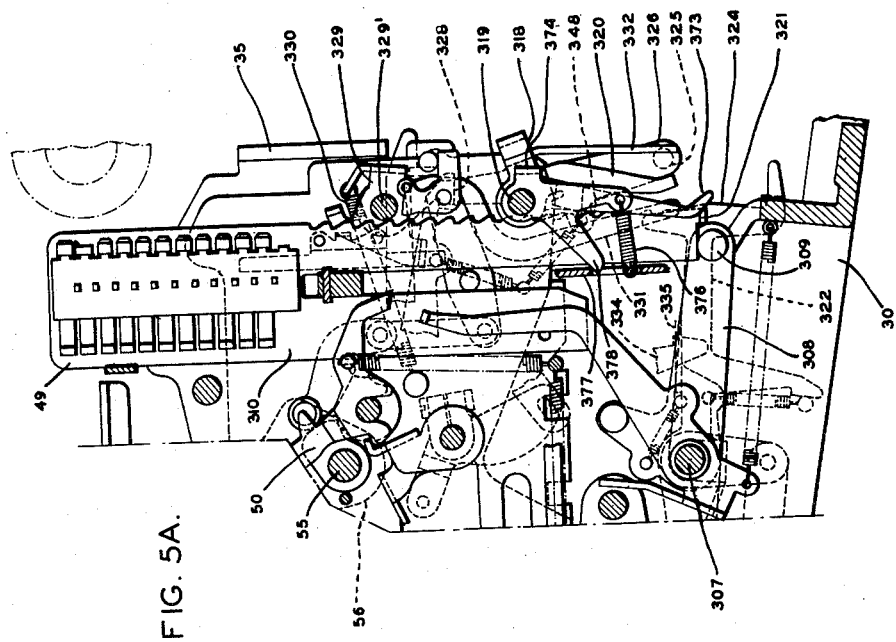
Figure 6A:
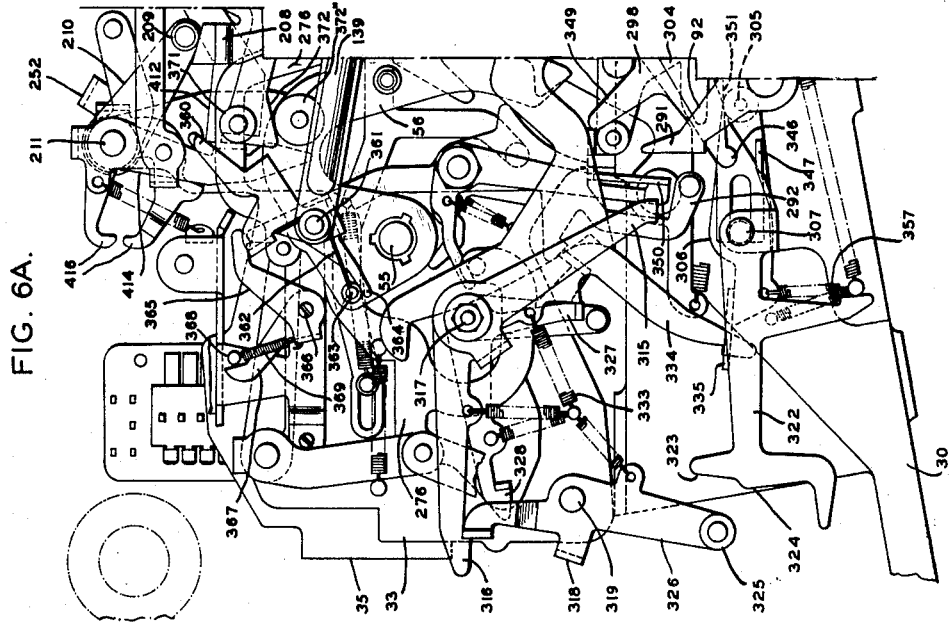
Figure 7A:
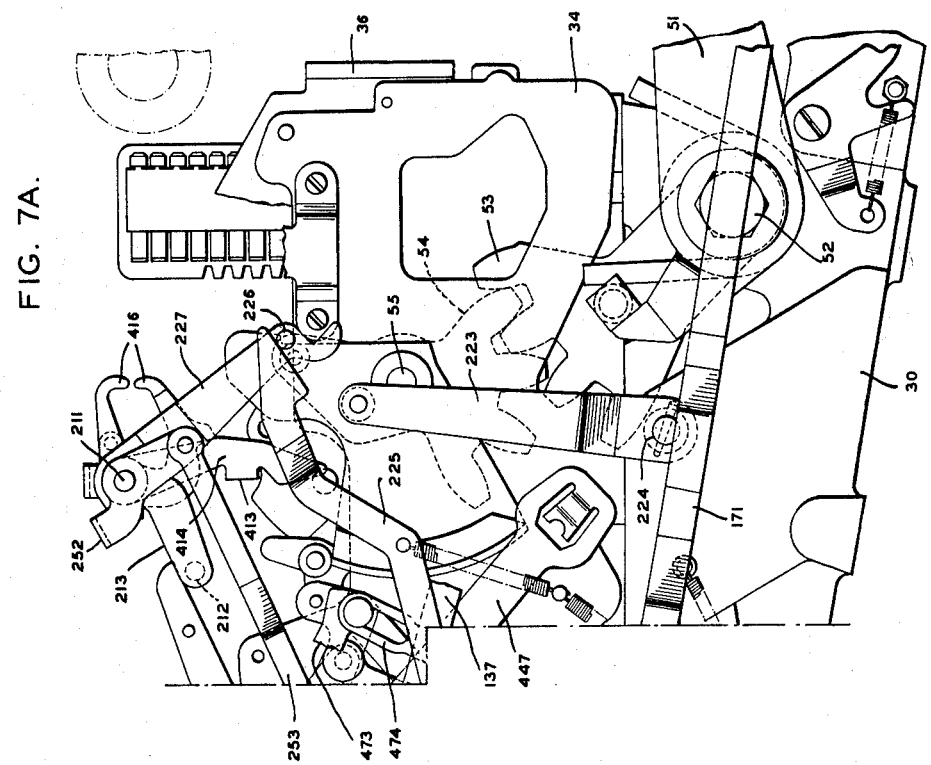
Figure 7:
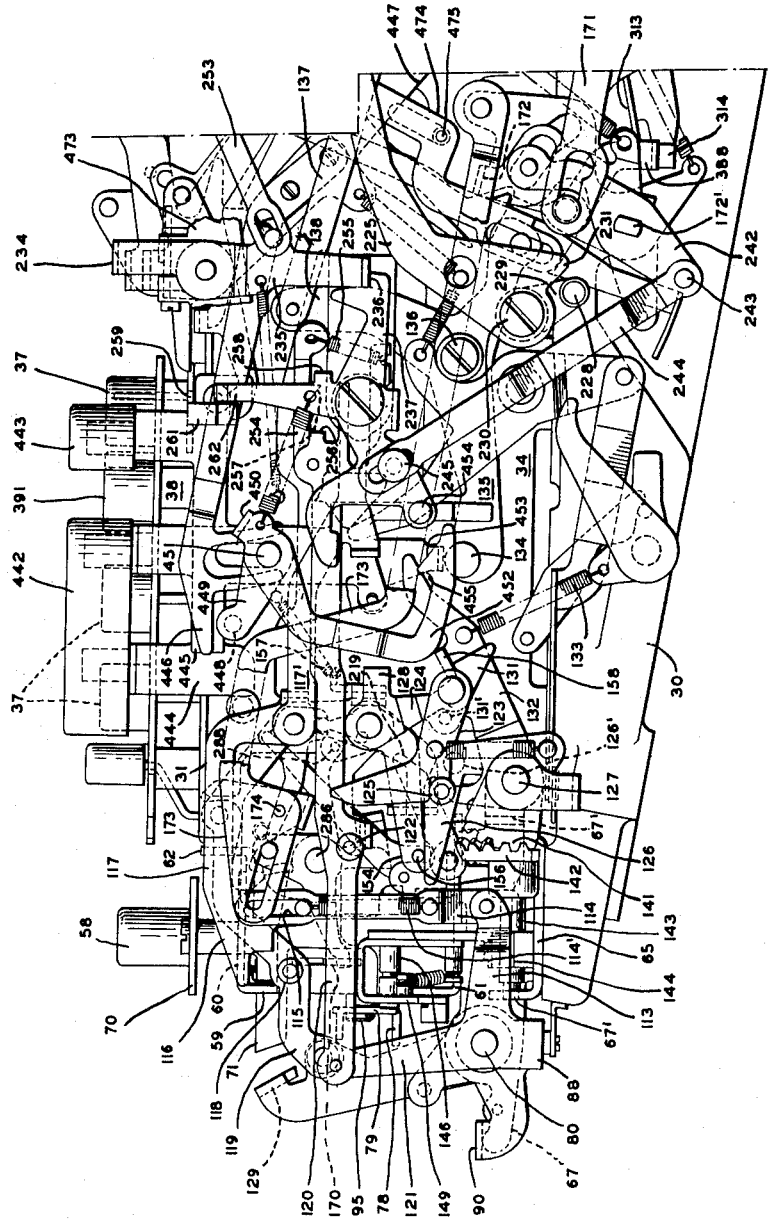
Figures 9, 9A:
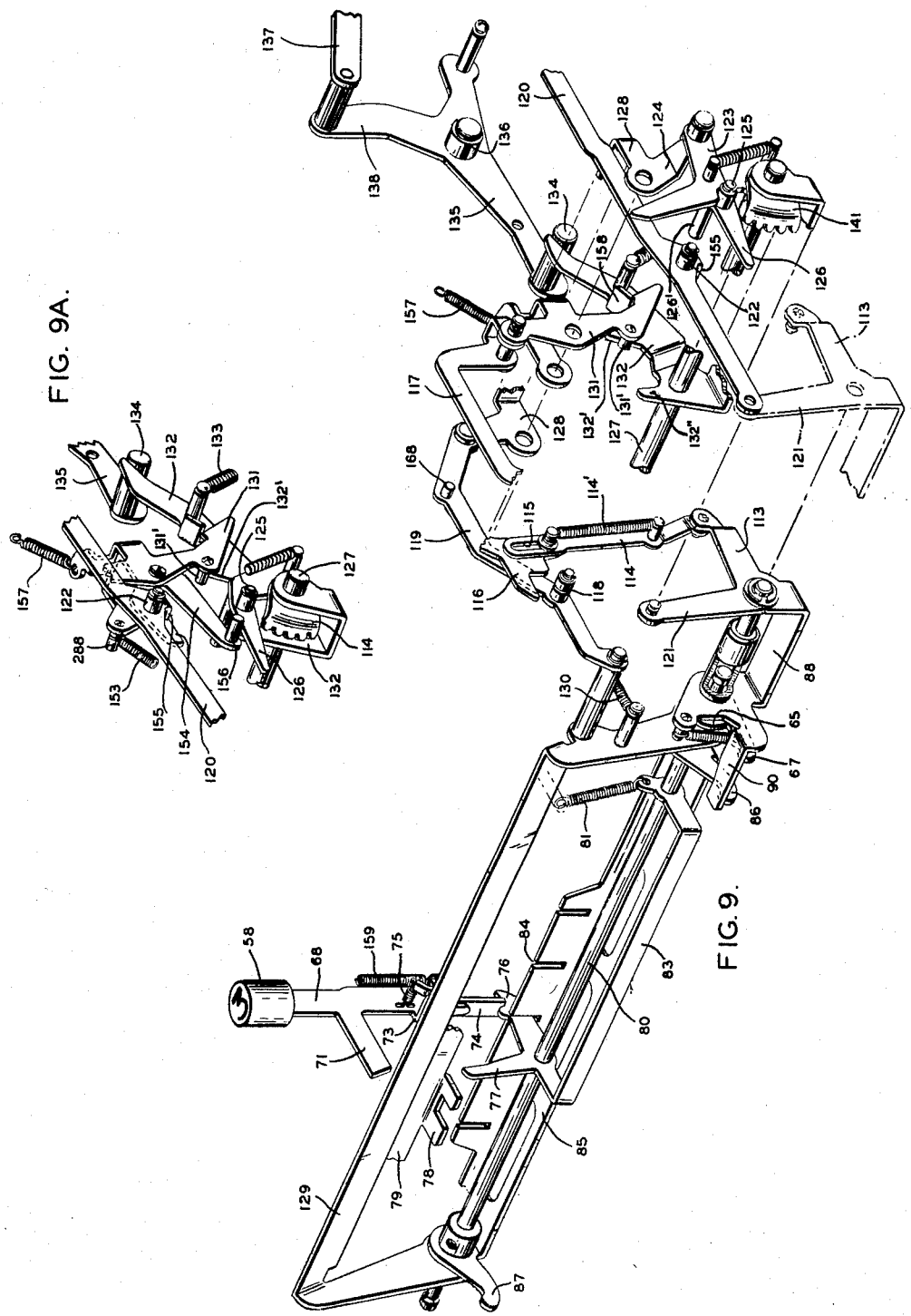
Figure 10:
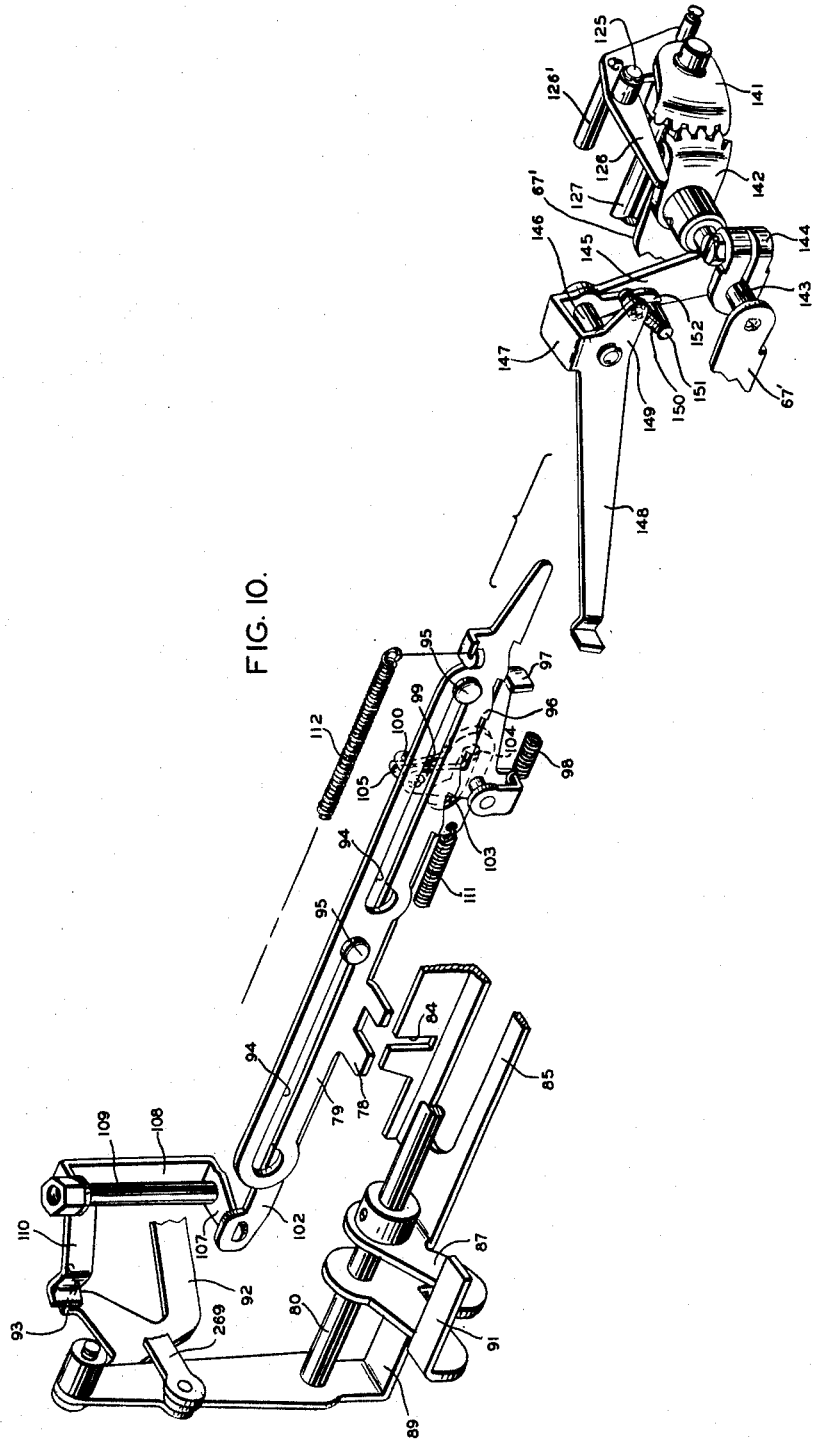
Figure 11:
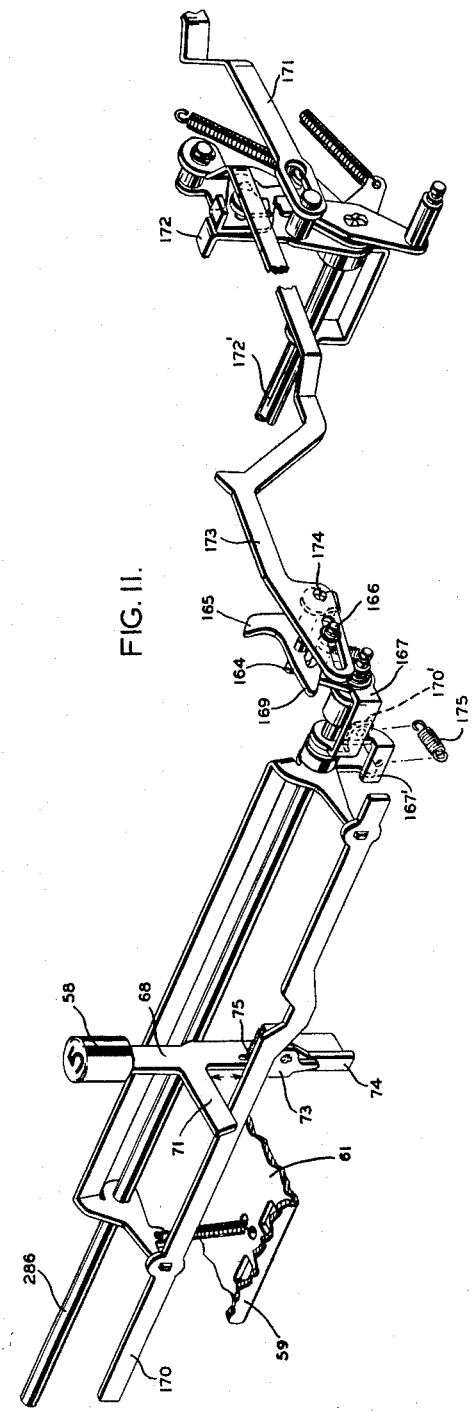
Figure 12:
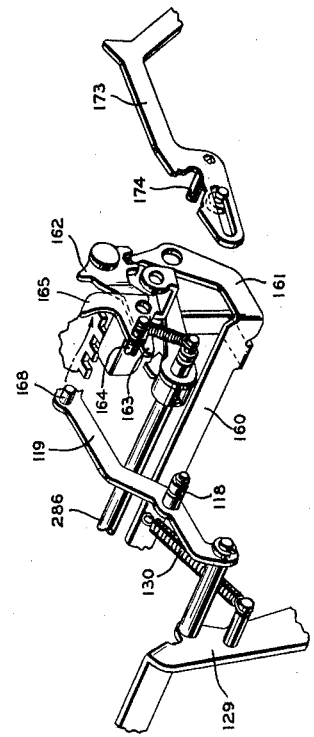
Figure 17:
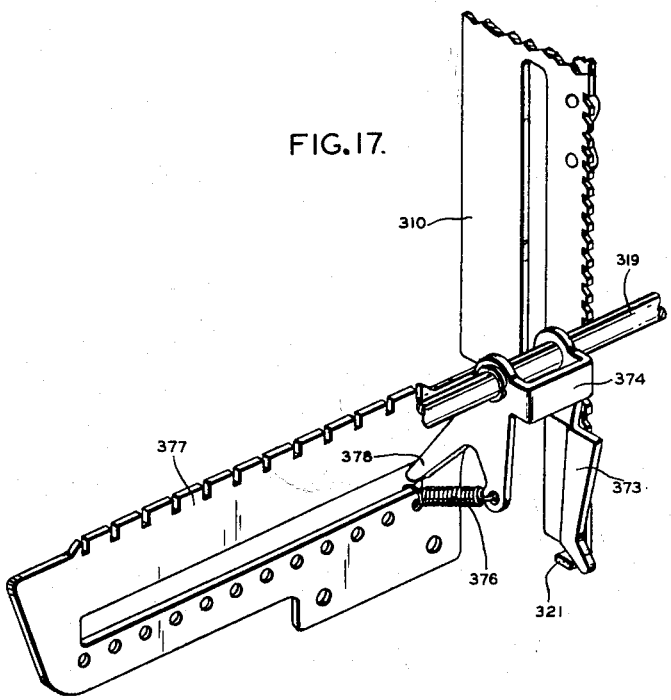
Figure 18:
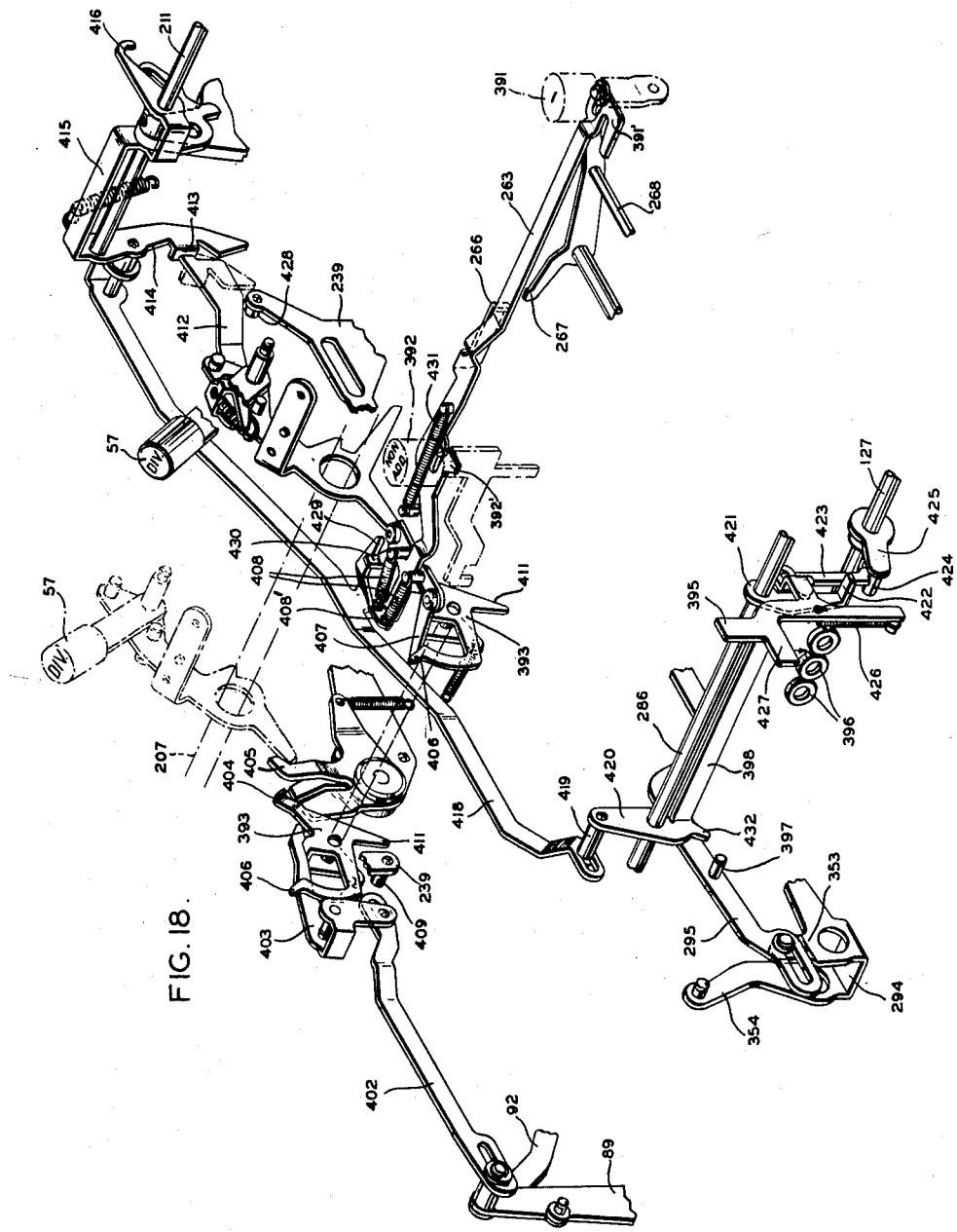
Figure 19:
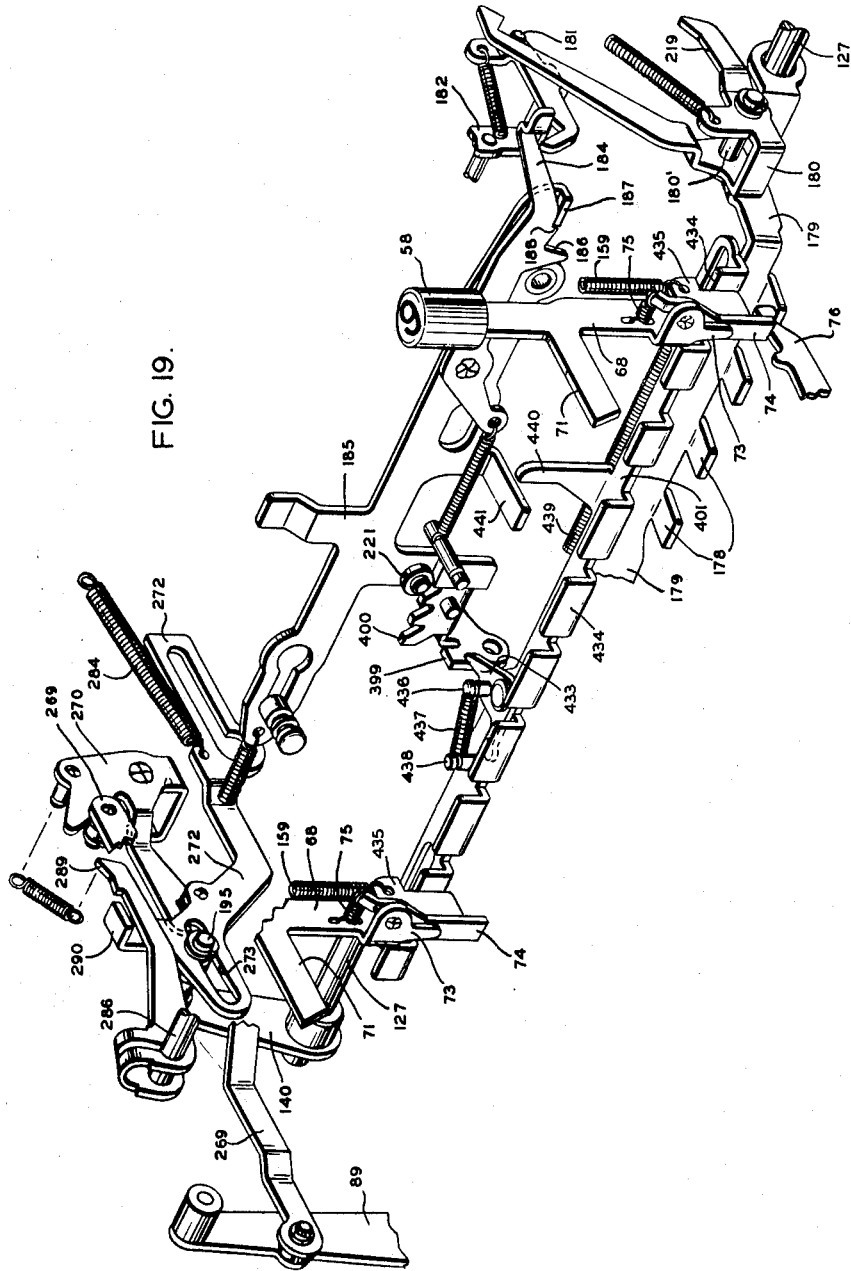

The preferred form of the invention is shown in the accompanying drawing with the cover casing removed, and in which FIG. 1 is a front elevation of the multiplier keyboard;
FIG. 2 is a rear elevation of the multiplier keyboard removed from the machine;
FIG. 3 is a front elevation of the machine with the multiplier keyboard removed, and with certain parts at the sides shown in section;
FIGS. 4 and 4A taken together constitute a plan view of the machine with the casing and the keyboard removed, but with the multiplier keyboard in position;
FIGS. 5 and 5A taken together constitute a vertical longitudinal section taken approximately on the line 5—5 of FIGS. 4 and 4A;
FIGS. 6 and 6A taken together constitute a left side elevation of the machine;
FIGS. 7 and 7A taken together constitute a right side elevation of the machine;
FIG. 8 is a partial perspective view of the front end of the machine showing the main keyboard and the multiplier keyboard;
FIG. 9 is a perspective view of certain parts having to do with the operation of the "two" through "five" keys with some portions of it shown in exploded relation;
FIG. 9A is a detail perspective showing some of the parts of FIG. 9 in their normal relation;
FIG. 10 is an enlarged perspective of an operating slide and associated parts;
FIG. 11 is a perspective of the multiplier key restoring mechanism;
FIG. 12 is a perspective, with parts exploded, of certain parts of the mechanism of FIG. 11;
FIG. 13 is an exploded perspective of mechanism in short cut multiplication particularly the escapement mechanism and the non-print control mechanism;
FIG. 14 is a perspective of mechanism involved in automatic blank stroke and total taking operations;
FIG. 14A is a detail of the mechanism of FIG. 14;
FIG. 15 is a perspective of mechanism involved when the "zero" or "one" key are depressed, with some parts exploded and some omitted;
FIG. 16 is a perspective of the mechanism for operating the quotient rack with some parts exploded;
FIG. 16A is a perspective of other parts of the mechanism of FIG. 16 with some parts exploded and some others omitted;
FIG. 16B is a perspective detail of FIG. 16 showing mechanism to backspace and step up the M and Q rack five positions;
FIG. 16C is a partial rear perspective of the latches and bails employed in connection with the blocking and holding of the M and Q rack;
FIG. 16D is a detail perspective drawn out of FIG. 16 to avoid confusion;
FIG. 17 is a detail perspective of the rack snubbing device;
FIG. 18 is a perspective of certain key interlock mechanisms in partly exploded form;
FIG. 19 is a perspective of certain selective interlocking mechanisms for the multiplier keys;

Former General Structure

The machine on which the herein improvements are imposed is of the type shown in the cited references above, especially that shown in Patent 2,726,037 and involves a base plate 30, upper and lower keyboard plates 31 and 32, outer vertical plates 33 and 34 and inner vertical plates 35 and 36 suitably braced (see FIGS. 4 and 5). The regular digit keys 37 have stems 38 which are depressed to set pins 39 on a pin carriage 40 which is escaped step by step in the usual manner by means not shown herein, but shown in FIG. 6 of Patent 2,726,037 above. The pin carriage 40 (FIG. 5) is backspaced by means of pawl 41 (FIG. 3) cooperating with backspace rack 42 in the usual manner through operation of arm 41' and backspace shaft 43. The set pins 39 are, when set, disposed in the path of lips 44 on slides 45 cooperating with adding racks 46, the teeth 47 of which, mesh with the accumulator wheels 48 (FIG. 5). These racks also mesh with pinions (not shown) to elevate the type racks 49 (FIGS.

4 and 5). The printing hammers 50 are fired generally in the manner as set forth in FIG. 1 of Patent 2,203,336. The machine is driven by an electric motor (not shown) but generally as shown in FIG. 6 of Patent 2,229,980 above, and this action oscillates bellcrank 51 (FIG. 7A) pivoted at 52 and having a gear sector 53 meshing with a similar sector 54 fixed to main shaft 55. On the opposite end of the main shaft 55 is the backspace cam 56 (FIG. 6A) described and shown as part 194 (FIG. 3 of Patent 2,726,037). There is also shown the division lever of key 57 (FIG. 6) and its associated elements which are in the main the same as in the above Patent 2,726,037 (FIG. 3 thereof). The general structure and operation of the present machine is in many respects the same as the patent above, and any changes and alterations thereof will be taken up in connection with the description of the structure and operation of the improvements which constitute this invention, and which are in one or another manner related to the regular elements.

*Structure and Operation of Improvements*

It should be recalled that in the machine of the invention, instead of pushing a multiply lever and watching a dial, it is merely necessary, after the multiplicand has been properly entered in the pin carriage, to press the proper multiplier digit key to start the machine and multiply by that digit. If that is the only multiplier digit involved in the operation, the machine will automatically proceed to take a total. Otherwise, the next digit key is depressed until the last multiplication has taken place, whereupon the machine will proceed to take and print the total. This last operation involves two cycles. When the first multiplier digit is cycled, on the last cycle of this series of multiplication cycles, the digit involved and the multiplicand are printed. Further multiplication cycles for other digits of the multiplier will involve only the printing of the multiplier digit until the printing of the total or product as above stated.

A main feature of the present invention resides in a multiplier keyboard which is attached to the front of the machine and supports a plurality of multiplier digit keys 58 representing digit values from 0 to 9. These are supported on a C shaped frame having a vertical wall 59 (FIG. 5), top and bottom rearwardly extending walls 60 and 61. The rear of the top wall 60 is secured to an angle member having apertured ears 62 permitting the frame to be fastened by means of screws 64 to a cross bar 63 on the front of the main body of the machine. Secured to the bottom wall 61 is a member 65 having dependent L-shaped ends apertured on their base portions and screwed to the base plate 30 of the machine (FIG. 6). The opposite vertical edges of the wall 59 have rearwardly extending flange plates 66 (FIGS. 1, 2 and 5). The L-shaped members 65 have forwardly extending flanges 67 acting as journals for certain shafts and rods later mentioned.

The multiplier keys 58 have stems 68 which are guided in slots 69 (FIG. 8) in the top and bottom walls 60 and 61 of the unit frame. The enlarged heads of the keys are guided in openings (not shown) in a cross plate 70 (FIG. 2) supported above and parallel to the top wall 60 of the frame of the unit. The stems 68 have forwardly projecting fingers 71 extending through slots 72 in the front wall 59 of the C frame to prevent angular turning of the stems (FIG. 1). The lower portion of the keys stems 68 having laterally turned ears 73 (FIG. 13) to which are pivoted pawls 74 to the upper end of which are connected springs 75 fastened to the stems 68. In general the depression of a "two" to "five" key 58 (FIG. 9) will cause the pawl 74 to bear down on one arm 76 of a bellcrank, the other arm 77 of which acts as a block arm and, when a key is depressed, is disposed in the path of movement of forwardly extending spaced ears 78 of a step-by-step slide member 79. The arm 76 is positioned in a comb plate 85 which is spring urged to the right by a spring 82 (FIG. 2). When an ear 78 contacts the block arm 77, which is disposed in its path, it moves the arm 77 and the comb plate 85 which are pivotally and slidably mounted on cross rod 80, to the right, thus releasing its cooperating arm 76 from the pawl 74. The arm 76 then rocks counterclockwise (FIG. 9) under the influence of springs 81 out of contact with ears 78 and is moved to the right to normal position under the influence of spring 82 acting on comb-plate 85 (FIG. 2). After the ear 78 contacts the arm 77 and releases it, the key stem 68 does not restore until the next stroke, as will later be seen. Therefore, when the block arm 77 moves to the left (FIG. 9) the pawl 74 will yield to the left thus removing pressure from the key stem. The key stem is now free to restore when unlatched. It will be seen from FIGS. 4A and 8 that bails 83 are connected respectively between the arms 76 associated with the keys 2 and 9, the keys 3 and 8, the keys 4 and 7, the keys 0 and 1, and the keys 5 and 6. It can be perceived from FIGS. 1 and 8 that there are ten arms 76, but only five block arms 77. Therefore, it is equally obvious that the operation of keys 0 and 1 will set up a common block arm; the operation of key 9 will set up the block arm associated with key 2; the operation of key 8 will set up the block arm associated with key 3; the operation of key 7 will set up the block arm associated with key 4; and the operation of key 6 will set up the block arm associated with key 5. This is for the purpose of setting up multiplication by the complementary or short cut method, as is explained in the aforementioned parent Patent No. 2,984,411.

*Mechanical Operation When Keys 2 to 5 Are Operated*

As a multiply key, such as for the digit "three" (FIGS. 9 and 9A) is depressed, the pawl 74, pivoted to the key stem 68, contacts and depresses arm 76 and causes its block arm 77 to be positioned in the path of ears 78 on slide 79. The arm 76 also lies in a slot 84 in a comb plate 85 which is also pivotally mounted on rod 80. There are five slots 84 in the comb plate 85 to receive arms 76 related to keys 1, 2, 3, 4 and 5. At its ends the comb plate has forwardly extending arms 86 and 87 which respectively are adapted to operate the motor drive control bellcrank 88 (FIG. 9) and the multiply non-print bellcrank 89 (FIG. 10) through the respective offset arms 90 and 91 as said comb is rocked by the depression of a key (FIGS. 9 and 15).

As the multiply non-print bail 89 rotates clockwise (FIG. 10) it will position the multiply mechanism operating slide 92 rearward (FIG. 10). The slide 92 has an ear 93 thereon. Slidably attached to the front of wall (FIG. 1) by slots 94 and studs 95 (FIGS. 1, 8 and 10) is the key stem bellcrank operating slide 79. The right hand lower edge of slide 79 has teeth 96 engageable by the end of a latch pawl 97 pivoted on the wall 59 and normally urged into engaging relation with the teeth by a spring 98. An upright arm 99 of the pawl 97 has a stud 100 extending rearwardly through a hole 101 in wall 59. Back of wall 59 is an elongate link 102 slotted at 103 to ride on a stud 104 (FIG. 10) fastened to the back of wall 59. This link at its right end has an upright finger 105 which is adapted to engage the stud 100 to move it to the right and depress the pawl 97 against the action of spring 98 fastened at one end to pawl 97 and at the other to the front face of wall 59. One end of link 102 is slotted to receive the end of arm 107 of a bail 108 rotatable on rod 109 which is supported from upper wall 60 and cross plate 70 (FIG. 1). This bail 108 also has an extension 110 at its upper end which normally lies in front of ear 93 on link 92. When the link 92 is moved rearward the ear follows and bail 108 is turned by reason of the pull of a spring 111 (FIG. 10) fastened at one end to link 102 and at the other end to the back of wall 59. It will thus be seen that upon continued movement of link 92 to the rear, extension 110 will be rotated by spring 111 acting on slide 102, thus permitting arm 105 to follow, relieving the stud 100 of pressure from arm 105 thus allowing pawl 97 to be swung by spring 98 into place to engage the teeth of the slide 79. When the link 92 moves forward again the reverse operation takes place and the pawl 97 is disengaged and the slide 79 is snapped back to normal by the spring 112 (FIG. 1) fastened at one end to the slide and at the other to the front face of the wall 59. How the slide 79 is advanced step-by-step will now be set forth.

When the motor drive bellcrank 88 is rocked clockwise (FIGS. 9 and 9A) an arm 113 thereon moves down and pulls down a link 114 having a pin and slot connection 115 with a nose 116 on the front end of a link 117. The nose 116 is connected by spring 114' to the link 114. This disposes the nose 116 in the path of a roller 118 on a link 119 whereby link 117 is moved rearwardly when the link 119 moves rearwardly. As bellcrank 88 rocks clockwise (FIG. 9) a link 120 attached to the upper end of its arm 121 is moved rearwardly and carries a roller 122 rearwardly. This roller 122 contacts a control arm 123 pivoted to the lower end of key stem release arm 124 and lifts said arm 123 from engagement with roller 125 on a gear arm 126 fastened to the universal drive shaft 127. The release of arm 124, dependent from bail 128, will permit the clockwise movement of key lock bail 129 through the action of link 119 and spring 130 fastened to a frame of the machine. This bail 129 will then move in over the extension 71 of the depressed key and hold it down until released. As link 119 moves rearward its roller 118, engaging depressed nose 116, will move link 117 rearwardly. The rear end of this link 117 is attached to the upper end of a motor control latch lever 131 which is rocked clockwise (FIG. 9) to release motor drive control arm 132 which, by spring 133, is rocked clockwise and its end presses on stud 134 on one arm of a three arm bellcrank 135 pivoted to the frame of the machine at 136, to rock this crank counterclockwise (FIG. 9) to start the motor through arm 138 and link 137 (FIG. 7). This crank 135 and link 137 are the same as crank 54 and link 45 shown in FIG. 5 of Patent 2,237,881 above, and operate to start the motor in the manner described therein.

In order to keep the latch 131 from engaging the lip 158 on the motor control arm 132 until the end of a multiplying operation and/or a total taking operation, the following operation takes place:—As the gear arm 126 rotates counterclockwise (FIG. 9) the stud 126' thereon encounters the front upright extension 132" on the arm 132 and lifts this arm. As the arm 132 is lifted, a raised portion 132' on the upper edge of arm 132 encounters a stud 131' on the lower end of the latch 131 to move it to the front away from the lip 158 on the arm 132. As the arm 126 returns, the stud 126' releases the extension 132' of arm 132 and the spring 133 pulls the motor control arm downwardly, so that this arm may start another cycle of operation.

As long as the latch lever 131 is held forward by the rearward position of the link 117, the latch 131 cannot engage the lip 158 on the motor arm 132. However, when the link 117 is moved forwardly the spring 157 will move the latch member 131 rearwardly to be in a position to engage with the lip 158. However, if the mechanism has to go through further strokes the raised portion 132' on the arm 132 does move the latch back to permit the further operation. When the motor strokes are ended then the arm 132 dropping from its high position will be caught by the latch.

As the motor operates, the back space cam 56 will turn clockwise (FIG. 16A). To this cam is connected a link 139 extending to an elongate stud 139' on an arm 140 fixed on the universal drive shaft 127. The oscillation of this drive shaft 127 will rock the bevel gear 141 on its end and this gear meshes with a simliar gear 142 (FIGS. 2 and 10) fixed to a stud shaft 143 journalled between spaced laterally extending flanges 67' of the multiplier unit keyboard frame. A yoke 144 fixed to stub shaft 143 has an upright arm 145 with a lateral stud 146 on which is pivoted a bail 147 having an extended actuating pawl 148 adapted to engage the teeth 96 on the slide 79 and pull it to the right, as viewed in FIG. 10. As the stub shaft 143 rocks clockwise in FIG. 10, the arm 145 so moves and lifts the pawl 148 to engage the teeth 96. The pawl 148 has a tail piece 149 to which is connected a spring 150 the other end of which is connected to a pin 151 fixed on the arm 145. The bail 147 has a tail 152 which limits the pin 151. As the arm 145 restores to normal the pawl 148 is lowered out of engagement with the teeth 96. Thus the slide is moved one space to the right on each machine operation, in which position it will be latched by the pawl 97.

In respect to keys 2 to 9, inclusive, the ears 78 on slide 79 contact block rams 77 on the next to the last multiply stroke and releases the arm 76 from the key stem pawl 74 as above mentioned. This allows the key stem comb 85 to restore and in turn permits the non-print bellcrank 89 to restore. The bellcrank 88 is prevented from restoring at this time because a spring 153 (FIG. 9A) will pull down cyclically operated latch 154 to latch over an ear 155 on link 120 to prevent the return of the link 120. This latching is effected on every forward stroke of the main shaft since the arm 126 (FIG. 9A) moves thus downward at that time and through pin 156 permits latch 154 to drop and engage the ear 155. This prevents the motor drive control arm 132 from being latched by the motor control latch 131. Control arm 123 will also be held up by contact with roller 122 on link 120, thus remaining above roller 125 on gear arm 126 and preventing the multiply key from being unlatched by key stem latch 129.

It was stated that comb 85 was restored on the forward stroke of the next to the last multiplying cycle of the machine. At this time latch 154 is holding link 120 rearwardly, preventing it from restoring. However, on the return stroke of this cycle the gear arm 126 will rotate clockwise and lift pin 156 on latch 154 to release latch from ear 155 and allow link 120 to restore. This will restore bellcrank 88 and as it does link 114 will rise and lift nose 116 from behind roller 118, allowing spring 157 to move the motor control latch 131 to the rear to enable it to latch under lip 158 on the motor control arm 132 at the end of the following main shaft stroke. On the last forward stroke of the multiplying cycles as gear arm 126 on the universal drive shaft 127 moves downward, the control arm 123 will drop behind the roller 125 on said arm 126 and on the return stroke the roller 125 will drive the arm 123 to the rear and through arm 124 rock bail 128 counterclockwise, thus driving link 119 forward and unlatching the multiply key 58 which will tend to restore under the tension of its own spring 159 (FIG. 9). The machine will print and backspace on this stroke, as disclosed in Patent 2,726,037 above.

*Short Cut Multiplication—(Keys 6, 7, 8 and 9)*

The number "eight" key will be used as an example to describe short cut multiplication. When this key is depressed the pawl 74 (FIG. 13) thereon will contact arm 76 loose on shaft 80. A stud 176 on the arm will engage a projection 177 on bail 83 to rock the bail 83 and advance to the rear the block arm 77 aligned with the number "three" key as above explained. This action will also rock the comb 85 (FIGS. 9 and 10) as above set forth and rock bails 88 and 89 as and for the purposes already set forth. As the rear end of arm 76 moves down it will contact the ear 178 on bail 179 and rock said bail which is loosely rotatable on universal drive shaft 127 in a counterclockwise direction. Rotatably mounted on stud 180' (FIG. 13) carried by the bail 179 is a second bail 180 having an upward extending hook member 180a. As the bail 179 is rocked the hook member 180a engages stud 181 on drive bail 182 pulling the stud 181 forwardly and rocks the bail 182.

The bail 182 as it rocks raises control slide latch 184 permitting stop section control slide 185 to move one space to the left against step 186 of the latch 184. The control slide 185 is slidably mounted on the front wall of the stop carriage and has at its right end an ear 187 which normally lies against an initial step 188 of the latch 184. Thus when any of the above mentioned keys are depressed the pin carriage is stepped one more space to the left equivalent to multiplying the multiplicand by ten.

*Interlocks—(FIGS. 18 and 19)—General Résumé*

(A) The division key 57, the subtract key 391 and the non-add key 392 are blocked during multiplication. The division key 57 is blocked by the division interlock block arm 393 (FIG. 18). The keyboard, subtract and non-add keys are blocked by the multiply and division keyboard interlock slide 263 (FIG. 14).

(B) All multiply keys 58 are blocked during division by the key stem interlock plate 395 (FIG. 18) moving down between the key stem interlock rollers 396.

(C) All multiply keys are blocked against depression when the main shaft is out of normal position by the key stem interlock plate 395 moving down between rollers 396.

(D) When a multiply key is depressed all other multiple keys are blocked against depression by the key stem interlock arm 427 moving in between the rollers 396. Therefore, it is impossible to depress more than one multiply key at a time.

(E) Stud 397 on non-add link 295 trips the key stem interlock plate 395 through bail 398.

(F) When the pin carriage 40 is in normal position, all multiply keys are blocked by a dependent extension 399 (FIG. 19) on backspace rack 42 holding the multiply key lock slide 401, through yielding pawl 433, under the multiply key stems.

(G) Multiply keys zero through five are blocked by slide 401 if any multiply key six through nine is partially depressed and then allowed to restore.

(H) Multiply keys zero and one are blocked against a second depression, if depressed part way and then allowed to restore, by the multiply non-print bellcrank slide retaining arm 289 (FIG. 15) limiting against the bottom of lateral ear 290 of slide 272.

*Interlocks (Detail Operation)—FIGS. 18 and 19*

These interlocks operate more in detail, as follows:

*Division Interlock*

As a multiply key is being depressed, and near the end of its downward movement, non-print bellcrank 89 pushes division interlock arm latch link 402 rearward. The other end of this link is connected to division interlock arm latch 403 which is rocked to release division interlock block arm 393 and allow its hooked end 404, under tension of a spring (not shown) to drop in front of latch arm 405 of the division key latch structure, so that the division key cannot be depressed. This latch 405 in similar form is shown in Patent 2,237,881 (FIG. 24) and described on page 11 first column. As block arm 393 rocks rearward its rear vertical extension 406 will contact and move pivoted bellcrank 407 the other end of which through one of the springs 408 connected to lip 408' of slide 263 will move slide 263 to the right to block the subtract and non-add keys by placing lips 392' and 391' under lugs (not shown) on the stems of these keys. This movement also will cause the lip 266 to move over the extension 267 on the universal bar 268 above mentioned, thus blocking the keyboard keys, until block arm 393 is restored to normal by stud 409 on the total slide 239 by contacting the lower extension 411 on arm 393 as the total slide moves to the rear on a total operation. Then spring 431 can restore the slide 263 to normal to unlatch the keys mentioned, and the division key is unlatched from the block arm 393.

*Multiplication Interlock*

Depression of the division key 57 pushes the rear of printing hammer catch block arm 412 (FIG. 18) below lateral extension 413 on hammer catch arm 414 dependent from bail 415 which is rocked by a spring to shift the hammer latches 416 so that the quotient hammer is unlatched and the multiplier hammer is latched, by engaging with studs such as 417 (FIG. 5) on the hammers 50. As bail 415 is thus rocked loosely on shaft 211 it pushes forwardly the multiply interlock bail operating link 418, one end of which is connected to bail 415 below its pivot shaft and the other end of which is connected to a pin 419 on arm 420 loose on shaft 286 and supporting multiply interlock bail 398 which is thereby rocked counterclockwise. The other end of bail 398 is connected to an arm 421 loosely dependent from shaft 286 and which has a lateral ear 422 which is swung rearwardly to trip key stem interlock retaining pawl 423 off of stud 424 on an arm 425 fixed to universal drive shaft 127. Pawl 423 is supported from the rear of key stem interlock plate 395 which is then pulled down by spring 426 so that its front extension 427 is disposed between the key lock rollers 396 blocking the multiply keys from being depressed during division operations. This plate is kept down until the bail arm 414 is restored by the stud 428 on the rear end of the total slide 239 as it moves to the rear on a total operation. This release permits the pawl 423 to drop back to normal position over the stud 424 whereby, on the return stroke of that cycle, the stud will lift the pawl 423 and its associated interlock plate 395 and thus unlock the multiply keys 58. It is also to be observed that when the link 418 is moved forward to block the multiply keys 58 as above described, a lateral ear 429 on it will engage an arm on bellcrank 430 the other arm of which is connected to another of the springs 408 to move the slide 263 to the right thus locking the keys above mentioned as before, until released by the stud on the total slide restoring the print hammer catch bail as described above.

*Main Shaft Interlock*

It has been above mentioned that the pawl 423 rests on a stud 424 on an arm 425 fixed to the universal drive shaft 127. Since this shaft is driven from the main shaft 55 and backspace cam 56 through link 139, as soon as the main shaft starts from normal, shaft 127 rocks the stud 424 down and allows interlock plate 395 to drop placing its forward extension 427 between the rollers 396 and thus locking all the multiply keys by spreading the rollers, until the main shaft restores to normal and the stud 424 is lifted to lift the pawl 423 and the interlock plate 395. These rollers 396 are well known in the art and are in an enclosed channel (not shown). They have an accumulated clearance between them just sufficient for one multiply key to move down. Thus with any key down the rollers will block all the other multiply keys.

*Stop Section Interlock*

It is necessary to lock the multiply keys 58 when the non-add key 392 (FIG. 18) is depressed to prevent multiplying and non-adding at the same time. This is accomplished by reason of the fact that when the non-add link 295 is moved to the rear by rocking of arm 353 on bellcrank 294, a stud 397 thereon will contact the lower extension 432 of an arm 420 to rock the bail 398 counterclockwise which, as above set forth, will trip the interlock plate 395 to lock the keys.

When the stop section is in normal position, extension 399 on the backspace rack 400 will hold the key lock slide 401, through the intermediary of yielding pawl 433, so that the upturned ears 434 on slide 401 will normally lie underneath the projecting key shoulders 435 as indicated with respect to the "9" key in FIG. 19. The pawl 433 is pivoted on the base plate of the slide 401 and mounts a pin 436 to which is connected a spring 437 which at its other end is connected to a pin 438 also on the base of slide 401. As the multiplicand is entered into the pin carriage, the carriage moves to the left and extension 399 moves away from the pawl 433 and allows spring 439 to pull the slide 401 to the left one space distance so that the key stems, all of them, are permitted to be depressed all the way down the full distance in the space between the ears 434 of the slide 401. When the pin carriage restores, while a key is latched down, the extension 399 will merely engage and rock the pawl 433 and stretch the spring 437 so that when the key is released the spring 437 will snap the slide 401 to the right to dispose all its ears 434 under the shoulders 435 of the key stems 68.

It will be observed that the ears 434 (FIG. 2) are of different widths at their tops. This is so that when the carriage moves to the left upon entering of a numeral therein the slide will move one space to the left with the blocking ears 434 all removed from under the shoulders 435 and with the upright projecting finger 440 from the rear edge of the slide 401 blocked by the laterally projecting ear 441 (FIG. 19) of the control slide 185. Therefore, in this position any multiply key can be depressed.

With the slide 401 thus moved to the left one space and stopped there as described, if a short cut key such as nine is operated, this will result, as before explained, in the stepping of the pin carriage one more space to the left and this will move the ear 441 one space to the left allowing finger 440 to move correspondingly and space the slide 401 one space further to the left. This action will then dispose the respective ears 434 so that the keys zero to five will be blocked from depression and the short cut keys 6–9 will remain unblocked. This prevents misoperation of the keys zero to five. The position of the ears for this last named blocking action is shown in FIG. 2.

A novel system of interlocks has been provided, so that during division and multiplication no mis-operation can occur; during normal condition no multiplier key can be depressed until an entry has been made in the pin box; when such an entry is made any multiplier key may be operated; when such a key is operated no other such key may be operated until the operation is finished; when any of the short cut keys are operated the keys from "one" to "five" can not be operated; these interlocks automatically are accomplished by the depression of the desired key.

While there is above described but one embodiment of the invention, it is possible to produce still other embodiments without departure from the inventive concept above disclosed, and it is, therefore, desired that only such limitations shall be imposed on the appended claims as are stated therein.

What I claim is:

1. In a machine of the class described having a pin carriage reciprocable along a predetermined path of travel and a plurality of depressable multiplier keys, each one of which keys is provided with a dependent stem, a key lock slide having spaced key limiting ears, one for each of said keys, a spring for said slide biasing said slide for movement in a certain direction parallel to said predetermined path of carriage travel, a pawl on said slide, a projection on said pin carriage engaging said pawl to hold said slide in a first position against the biasing force of said spring under conditions where said carriage is in a first position, said ears of said slide being configurated and spaced along said slide so as to be disposed beneath their respective associated key stems preventing depression of such associated respective keys under conditions where said pin carriage is in said first position, said configuration and spacing of said ears being predetermined to position the space between adjacent ears below said key stems under conditions where said pin carriage is moved a predetermined distance in said certain direction causing said biasing spring also to urge said slide said certain distance.

2. In a machine of the class described as set forth in claim 1 wherein there is provided on said pin carriage, a control slide, said slide having a lateral ear projection therefrom, and said key lock slide having a finger disposed for engagement with said ear and positioned to limit movement of said key lock slide a predetermined step distance in said certain parallel direction.

3. In a machine of the class described as set forth in claim 2 wherein said plurality of keys consist of a first certain group of keys and a second certain group of keys and wherein means responsive to the depression of any of said keys of said second certain group cause said pin carriage to move in said certain direction a distance twice said certain step distance, said ear on said control slide, under such conditions, cooperating with said finger to limit movement of said key lock slide along said certain parallel distance twice said certain distance, and wherein said ears of said key lock slide provided for said key stems of said keys of said first certain group are of a certain predetermined stem limiting width such as to be each disposed in limiting position beneath the key stem associated with the key next adjacent in said certain direction, under conditions where said key lock slide is caused to move twice said certain distance.

4. In a machine of the class described having a pin carriage reciprocable along a predetermined path of travel and a plurality of depressable multiplier keys, each one of which keys is provided with a dependent stem, a key lock slide having spaced key limiting ears, one for each of said keys, a first spring for said slide biasing said slide for movement in a certain direction parallel to said predetermined path of carriage travel, a pawl pivoted on said slide, a second spring biasing said pawl counterclockwise, a projection on said pin carriage engaging said pawl to hold said slide in a first position against the biasing force of said first spring under conditions where said carriage is in a first position, said ears of said slide being configurated and spaced along said slide so as to be disposed beneath their respective associated key stems preventing depression of such associated respective keys under conditions where said pin carriage is in said first position, said configuration and spacing of said ears being predetermined to position the spaces between adjacent ears below associated ones of said key stems under conditions where said pin carriage is moved a predetermined distance in said certain direction causing said biasing spring also to urge said slide said certain distance, permitting depression of any one of said keys and insertion of their respective key stems into said spaces, said projection, under conditions where said carriage is moved said certain distance back to said first carriage position, urging said pawl clockwise against the bias of its said second biasing spring, said second biasing spring being selected of sufficient force to urge said slide back to said first slide position under conditions where said depressed keys are moved back to their respective undepressed positions.

No references cited.